H. L. PHELPS.
DUMPING WAGON.
APPLICATION FILED JAN. 7, 1911.
1,017,016.
Patented Feb. 13, 1912.
2 SHEETS—SHEET 1.
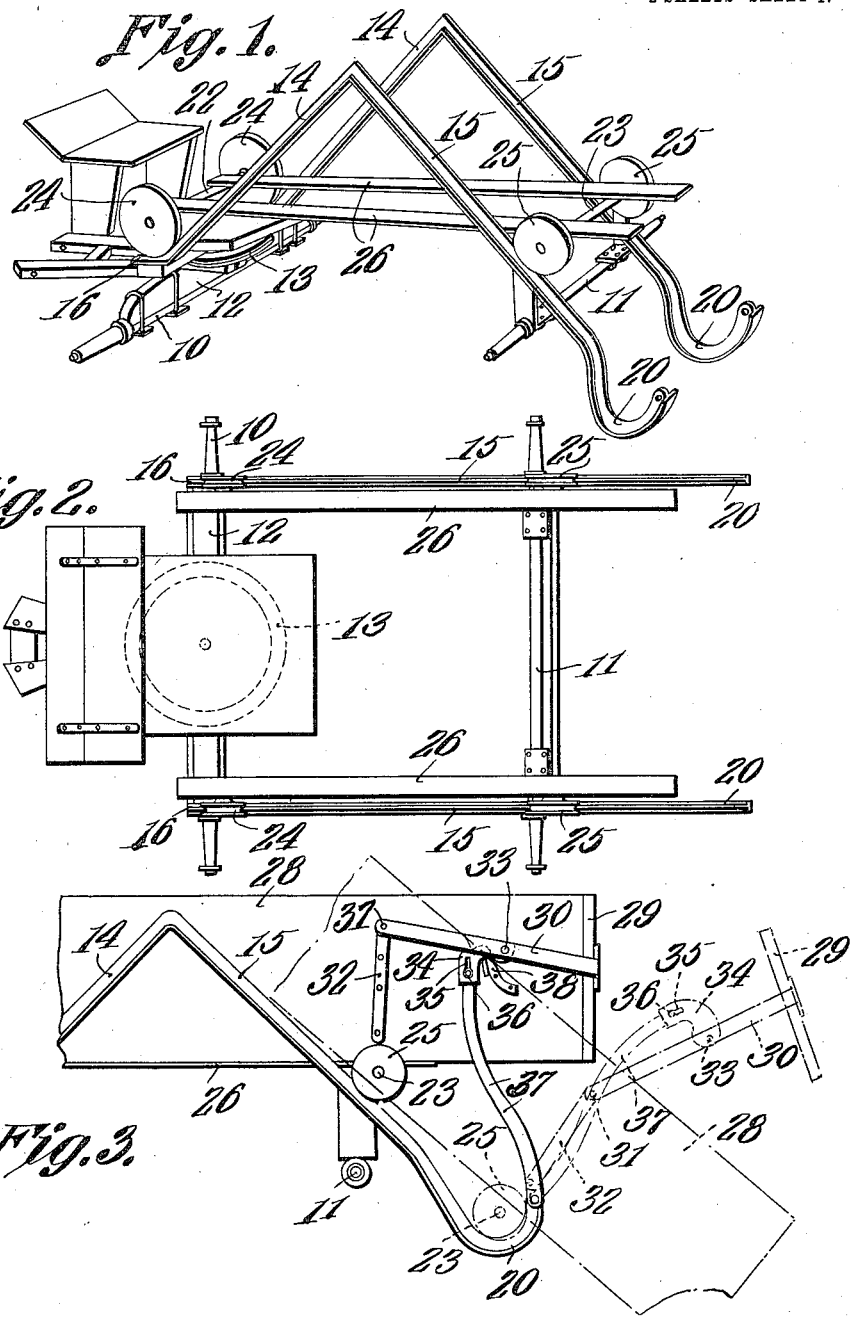
Homer L. Phelps,
Inventor
Witnesses
by
Attorneys

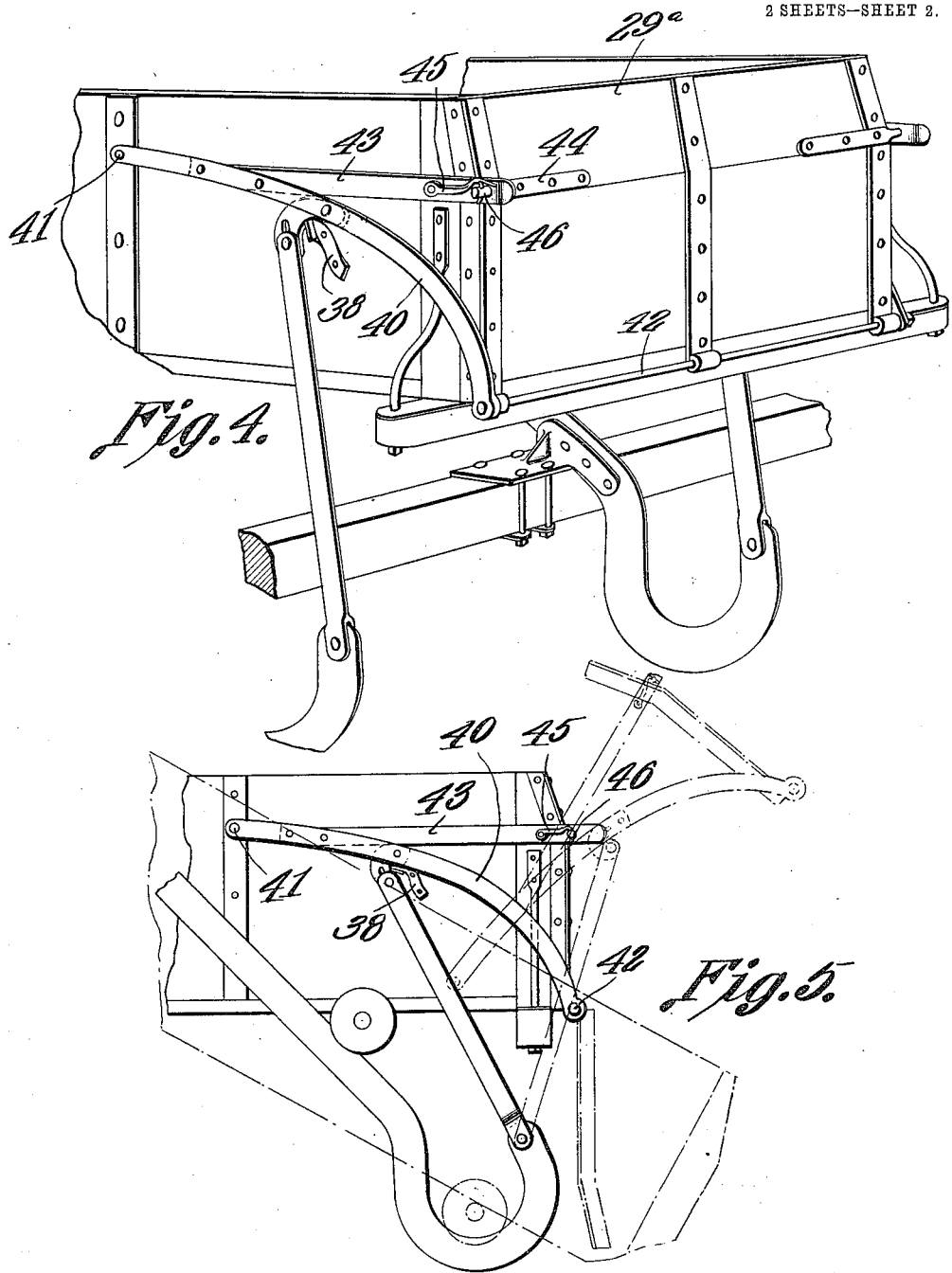

UNITED STATES PATENT OFFICE.

HOMER L. PHELPS, OF MARTINSBURG, WEST VIRGINIA, ASSIGNOR TO THE AUBURN WAGON COMPANY, OF MARTINSBURG, WEST VIRGINIA.

DUMPING-WAGON.

1,017,016. Specification of Letters Patent. Patented Feb. 13, 1912.

Application filed January 7, 1911. Serial No. 601,383.

*To all whom it may concern:*

Be it known that I, HOMER L. PHELPS, a citizen of the United States, residing at Martinsburg, in the county of Berkeley and State of West Virginia, have invented a new and useful Dumping-Wagon, of which the following is a specification.

It is the object of the present invention to provide an improved construction of dumping wagon and the invention aims primarily to provide a dumping wagon which will be simple in construction and substantial in structure.

One aim of the invention is to provide, in conjunction with wagon box dumping means, means for displacing the end gate of the wagon box, simultaneously with the dumping of the box and to return the end gate to position as the box is returned to its original position.

In the accompanying drawings: Figure 1 is a perspective view of a dump wagon constructed in accordance with the present invention, the wagon box, however, being omitted to more clearly disclose the construction and arrangement of the parts of the dumping mechanism. Fig. 2 is a plan view of the dumping mechanism, Fig. 3 is a side elevation of the rear portion thereof, the mechanism and wagon box being illustrated in full lines in normal position and in dumping position in dotted lines. Fig. 4 is a perspective view illustrating a slight modification of the invention. Fig. 5 is a side elevation of the rear portion of the wagon illustrating this modification.

In the drawings the numeral 10 indicates the front axle of the wagon running gear, the numeral 11 the rear axle, the numeral 12 the bolster for the front axle, and 13 the fifth wheel.

The dumping mechanism embodies spaced rails which are preferably of angle iron bent to form anticlinal portions 14 and 15. The portions 14 are inclined downwardly forwardly and the portions 15 of the rails are inclined downwardly rearwardly. The lower ends of the portions 14 of the rails are secured to the bolster 12 as indicated by the numeral 16 and the portions 15 of the rails are supported by and secured to the rear axle 11. The said portions 15 of the rails terminate in hooks 20.

The dumping mechanism embodies a frame arranged to support the wagon box and this frame includes in its structure axles which are indicated one by the numeral 22 and the other by the numeral 23. Wheels 24 are journaled at the ends of the axle 22 and travel upon the portions 14 of the rails and wheels 25 are journaled at the ends of the axle 23 and travel upon the portions 15 of the rails. Spaced bars 26 are secured at their ends to the axles 22 and 23 and serve not only to space the axles but also to complete the wagon box supporting frame or device, it being understood that the wagon box is disposed directly upon the bars 26.

From the foregoing it will be readily understood that the wagon box, is properly disposed upon the bars 26, they being moved from the full line position shown in Fig. 3 to the position shown in dotted lines in this figure, the wheels 24 traveling, as before stated, upon the portions 14 of the rails and the wheels 25 traveling downwardly upon the portions 15 of the rails. When the box has been moved to the dotted line position shown in the drawing, the wheels 25 will rest in the hooked ends 20 of the portions 15 of the rails and the box will be, therefore, firmly supported while its contents are being discharged.

As heretofore stated, means is provided, operating in conjunction with the dumping mechanism, for displacing the end gate of the wagon box simultaneously with the movement of the wagon box to dumping position. In the drawings, the wagon box is indicated by the numeral 28 and the end gate therefor by the numeral 29. Arms 30 are secured at their rear ends to the end gate and extend forwardly along the sides of the wagon box 28. These arms, at their forward ends, are pivoted as at 31 to brackets 32 upon the said sides of the wagon box. It will of course be readily understood that there are two of the arms 30, located at each side of the end gate and wagon box.

Pivoted as at 33 to the arms 30 at a point between their ends, are short curved arms 34 each formed with a slot 35 in which work pins indicated by the numeral 36. Arms 37 are pivoted at their lower ends to the extremities of the hooked ends 20 of the portions 15 of the rails and at their upper ends support the pins 36 which work in the said slot 35 in the short arm 34. Secured upon the sides of the wagon box 28 are stops 38 which are so positioned as to engage the short arms 34 when these arms are in full line position shown in Fig. 3 of the drawings, or, in other words, when the wagon box is in normal position.

By referring to Fig. 3 of the drawings, it will be observed that as the box is moved from full to dotted line position or in other words is moved to dumping position, the end gate 29 will be automatically moved to the dotted line position whereby to allow the contents of the wagon box to discharge by way of the rear end thereof. It will further be understood that owing to the moving mechanism connected with the end gate, as the box is returned to normal position, the end gate will likewise be returned to its full line position as shown in Fig. 3.

In the form of the invention shown in Fig. 4 of the drawings, arms 40 corresponding to the arms 30 are pivoted to the wagon box as at 41 and extend rearwardly and are curved downwardly with their rear ends located in a plane with the floor of the wagon box at the rear thereof. A hinge rod 42 extends between the rear ends of the said arms 40 and this rod hingedly supports the end gate which in this form of the invention is indicated by the reference numeral 29ª. Secured to each arm 40 is a rearwardly extending arm 43, and these arms 43 at their rear ends are formed with openings through which project the outer ends of brackets 44 secured upon the end gate. Latches 45 are pivoted upon the arms 43 and have their free ends engaged as at 46 through the said outer ends of the brackets 44. From the foregoing it will be understood that the arms 43 are rigid with respect to the arms 40 and that while normally the end gate is held rigid between the rear ends of the two sets of arms 40 and 43, for movement relative to the rear end of the wagon box when the box is moved from upright to dumping position and vice versa when the end gate is in the position shown in Figs. 4 and 5 of the drawings, the latches 45 may be disengaged from the outer ends of the brackets and the end gate swung down upon the hinge rod 42 as an axis. This is clearly shown in Fig. 5 of the drawings. It will further be understood at this point that even should the wagon body be moved to dumping position while the end gate is in dropped position, the dumping of the load will not be interfered with for the reason that the end gate hangs for free swinging movement and to a greater or less distance above the top of the wagon box at its lowered rear end.

What is claimed is:—

In a dumping wagon front and rear bolsters, spaced rails each having a single bend between its ends to form anticlinal portions extending forwardly and rearwardly, said forwardly extending portions being secured at their ends to the front bolster, means for connecting the rearwardly extending portions to the rear bolster, said portions being provided with hooked terminals, a wagon body, and wheels thereon movable along the rails and into the hooked terminals.

In testimony that I claim the foregoing as my own, I have hereto affixed my signature in the presence of two witnesses.

HOMER L. PHELPS.

Witnesses:
   CHAS. A. YOUNG,
   EDGAR C. TROUT.